United States Patent [19]

Masuhara et al.

[11] Patent Number: 4,903,336

[45] Date of Patent: Feb. 20, 1990

[54] TUNER WITH A TIMEPIECE

[75] Inventors: Masami Masuhara, Katano; Akihito Shimahara, Osaka, both of Japan

[73] Assignee: Sanyo Electric Co., Ltd., Osaka, Japan

[21] Appl. No.: 186,377

[22] Filed: Apr. 26, 1988

[30] Foreign Application Priority Data

Apr. 30, 1987 [JP] Japan .................................. 62-107513

[51] Int. Cl.[4] .............................................. H04B 1/06

[52] U.S. Cl. .................................... 455/344; 455/351; 368/10

[58] Field of Search ............... 455/344, 184, 151, 166, 455/158, 351, 89, 154, 156; 368/187, 10

[56] References Cited

U.S. PATENT DOCUMENTS

| | | | |
|---|---|---|---|
| 4,280,140 | 7/1981 | Skerlos | 455/184 |
| 4,306,294 | 12/1981 | Hashimoto et al. | 455/344 |
| 4,315,332 | 2/1982 | Sakami et al. | 455/344 |
| 4,320,529 | 3/1982 | Maeda et al. | 368/10 |
| 4,742,352 | 5/1988 | Ishii | 455/89 |

FOREIGN PATENT DOCUMENTS

| | | |
|---|---|---|
| 58-21864 | 5/1983 | Japan . |
| 59-1010 | 1/1984 | Japan . |

*Primary Examiner*—Robert L. Griffin
*Assistant Examiner*—Curtis A. Kuntz

[57] ABSTRACT

A tuner with a timepiece for a watch radio includes a display on which either a current time being counted by the timepiece or a frequency being received by the tuner is selectively displayed, and a first key group including a plurality of keys which are operated to control a function of the timepiece and a second key group including a plurality of keys which are operated to control a function of the tuner. An operation of the second key group is inhibited when the current time is displayed on the display. In this state, a displaying state of the display is automatically changed and the frequency is displayed on the display if a band key included in the second key group is operated, and thereafter the operation of the second key group is allowed to control the function of the tuner.

10 Claims, 11 Drawing Sheets

TUNER WITH A TIMEPIECE

BACKGROUND OF THE INVENTION

1. Field of the invention

The present invention relates to a tuner with a timepiece for a watch radio. More specifically, the present invention relates to a tuner with a timepiece which includes a display for selectively displaying a current time of the timepiece or a receiving frequency of the tuner.

2. Description of the prior art

Conventionally, a tuner with a timepiece which includes a display for selectively displaying a current time or a frequency, keys which are operated to control a function of the timepiece, and keys which are operated to control a function of the tuner is disclosed in, for example, Japanese Patent Publication No. 1010/1984.

In such a conventional tuner with a timepiece, in order to selectively display the current time or the frequency on the display, it is required to provide a manual switching circuit capable of manually changing-over inputs to the display, that is, the receiving frequency data from the tuner or the current time data from the timepiece. If a space where such keys are arranged is narrow, design or circuit arrangement is restricted, and therefore, a problem that freedom of design is lowered takes place.

In order to resolve such a problem, it is considerable that a displaying state of the display is automatically changed so as to display the frequency in response to an operation of the keys for controlling the tuner, as disclosed in, for example, Japanese Patent Publication No. 21864/1983.

In such a case, however, it is required to provide a manual switch for manually changing-over a display state to confirm the current time or the receiving frequency, and therefore the above described problem can not be resolved.

SUMMARY OF THE INVENTION

Therefore, one object of the present invention is to provide a novel tuner with a timepiece for a watch radio.

Another object of the present invention is to provide a tuner with a timepiece in which a time or frequency can be automatically and selectively displayed without an additional or dedicated key or switch.

The other object of the present invention is to provide a tuner with a timepiece in which a displaying state can be changed without provision any display changing switch being dedicated to a change of the displaying state.

In brief, the present invention is a tuner with a timepiece which comprises display means capable of selectively displaying a time or a frequency thereon; a first key group including a plurality of keys which may be operated to control a function of the timepiece; a second key group including a plurality of keys which may be operated to control a function of the tuner; means for inhibiting key entry of the second key group when a time displaying state is set; and means for allowing key entry of the second key group when a frequency displaying state is set in response to an operation of a specific key included in the second key group.

The displaying state of the display means is changed and the frequency displaying state is set if the specific key of the second key group which is utilized to control the function of the tuner, for example, a band key for changing a receiving band is operated when the current time is displayed on the display in the time displaying state. When the frequency displaying state is thus set, the key entry of the second key group for controlling the function of the tuner is allowed, whereby the function of the tuner becomes to be controlled.

In accordance with the present invention, the displaying state of the display means is automatically changed and the frequency is displayed on the display in response to the operation of the specific key included in the second key group for controlling the function of the tuner, and therefore, it is not necessary to provide an additional or dedicated key for changing the displaying state of the display means. Therefore, in accordance with the present invention, a restriction of design of the apparatus or arrangement of the circuit components can be decreased, and therefore, freedom of design is not lowered.

The objects and other objects, features, aspects and advantages of the present invention will become more apparent from the following detailed description of the embodiments of the present invention when taken in conjunction with accompanying drawings.

DETAIL DESCRIPTION OF THE PREFERRED EMBODIMENT

Figure 1:
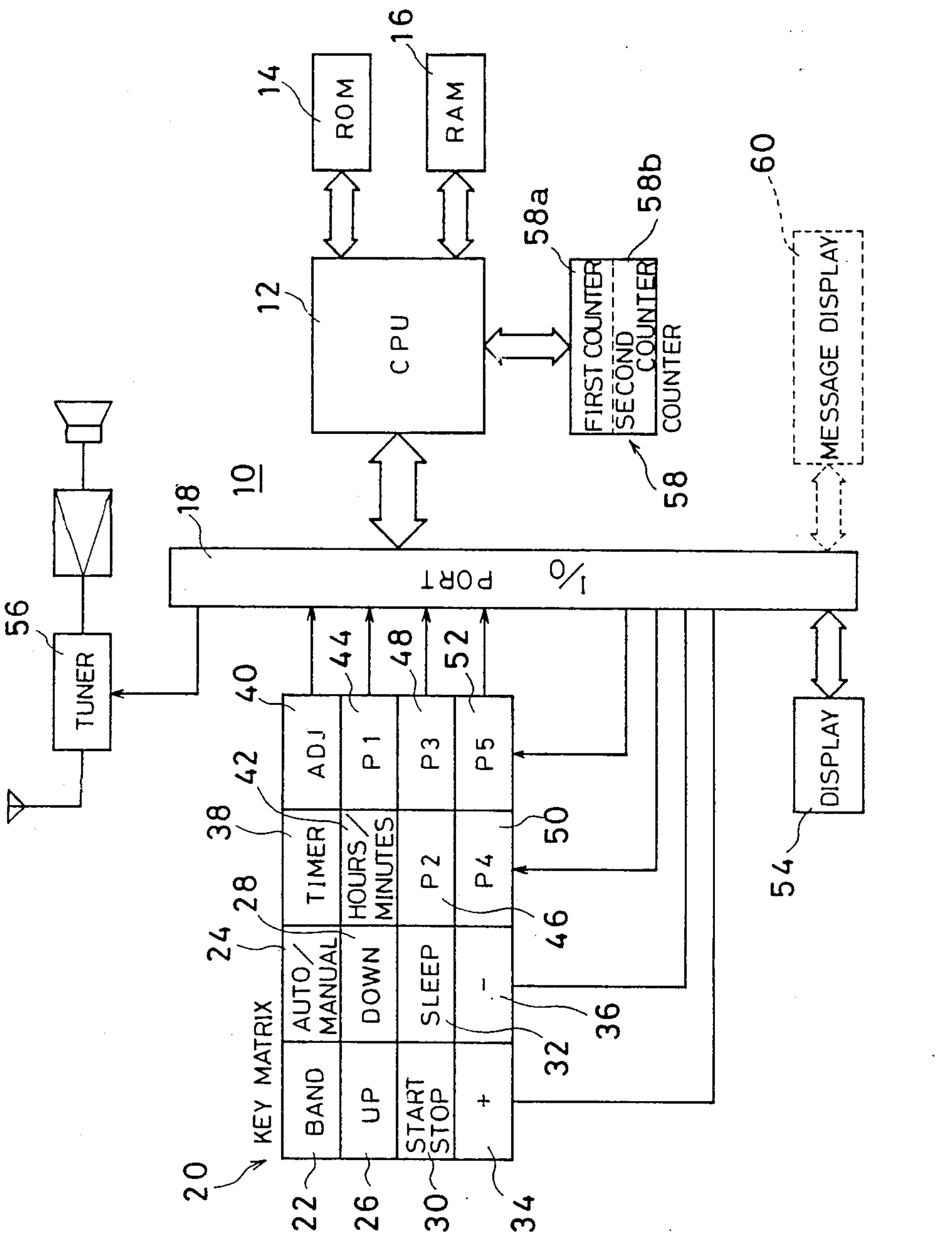
FIG. 1 is a block diagram showing one embodiment in accordance with the present invention.
Figure 2:
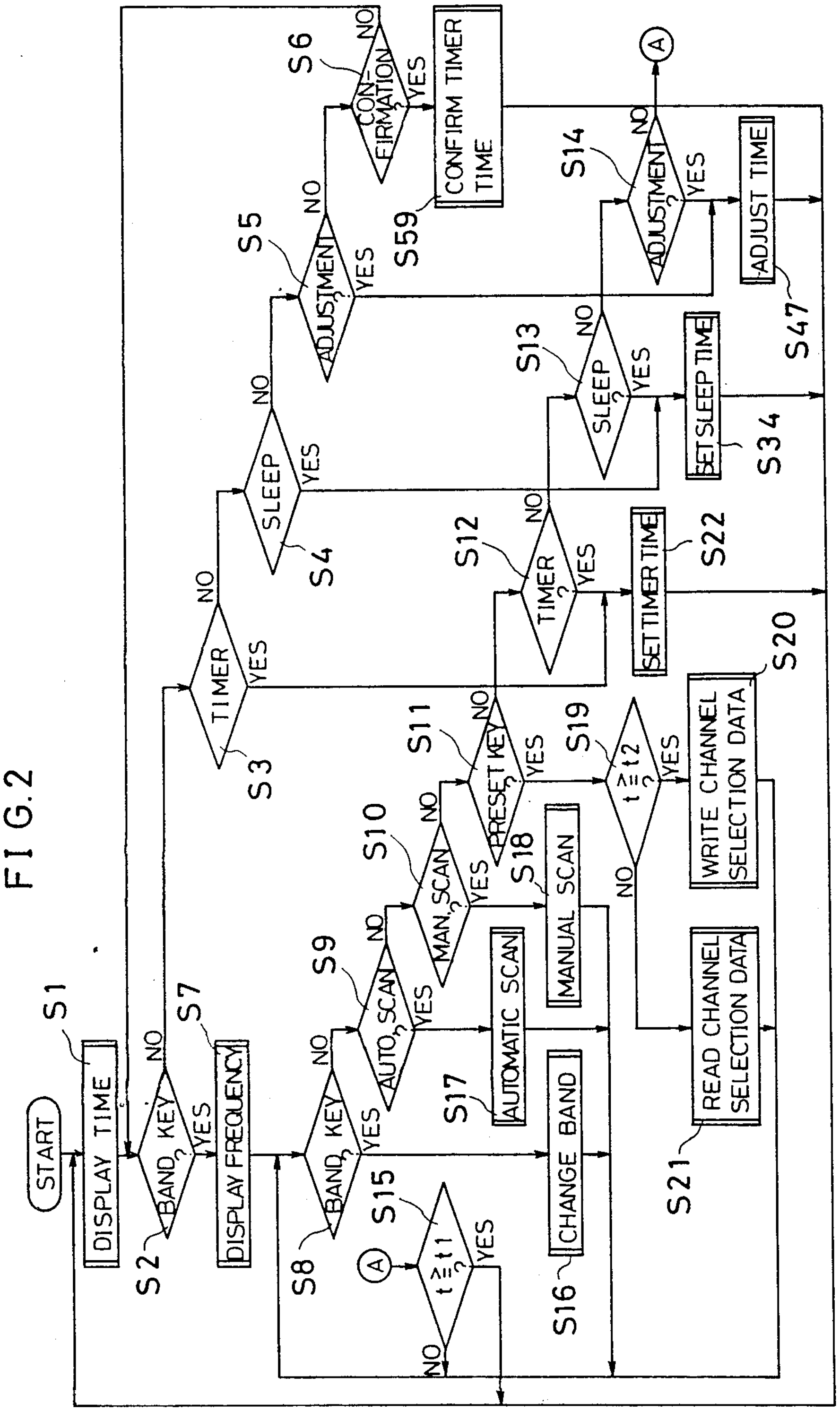
FIG. 2 is a flowchart showing an outline of an operation of FIG. 1 embodiment.

FIG. 1 is a block diagram showing one embodiment in accordance with the present invention. A tuner with a timepiece 10 includes a CPU 12, a ROM 14 which is connected to the CPU 12 and stores a program to be executed by the CPU 12 as described later, data of the constants and so on, and a RAM 16 which is also connected to the CPU 12, and in which data necessary for operation of CPU 12, for example, a frequency-division ratio to be set into a programmable frequency divider is temporarily stored.

An I/0 port 18 is provided in association with the CPU 12, to which a key matrix 20 is connected. The key matrix 20 includes a first key group and a second key group. The second key group includes a band key 22 for selecting or changing a frequency band to be received by a tuner, an auto/manual key 24 for changing between an automatic scanning mode and a manual scanning mode, an up key 26 for upward scanning, and a down key 28 for downward scanning. The first key group includes a start/stop key 30 for setting a timer start time and a timer stop time, a sleep key 32 for setting a sleep time, a (+) key 34 for increment a time, a (−) key 36 for decrement a time, a timer key 38 for setting a timer operation mode, an adjustment key 40 for setting a time adjustment mode, and an hours/minutes key 42 for changing between a digit of hours or a digit of minutes in setting or adjusting a timer time or a current time. Preset keys 44–50 are also included in the second key group of the key matrix 20. The preset keys 44–52 can be utilized for presetting the receiving frequency, i.e. a broadcasting station. Each of the preset keys 44–48 can be occasionally utilized as a confirmation key for commanding a confirmation mode of the set timer time. In addition, the preset key 52 can be occasionally utilized as a clear key for canceling or clearing the set timer time.

To the I/0 port 18, a display 54 on which a current time or a frequency is selectively displayed is connected. The display 54 includes a plurality of digits each of which is composed of a 7-segment display, for example.

A tuner 56 is also connected to the I/0 port 18 and is controlled by the CPU 12 through the I/0 port 18.

A counter 58 connected to the CPU 12 includes a first counter 58a which is utilized for counting a time lapse of a predetermined time t1, t2, or t3 as described later and a second counter 58b for counting the sleep time.

Next, in reference to FIGS. 2–6, a description is made on an operation of FIG. 1 embodiment.

First, an outline of the operation of the embodiment will be described. In the step S1, a time displaying state where the current time is displayed on the display 54 (FIG. 1) is set, and thereafter, in the step S2, it is determined whether or not the band key 22 is operated. If not operated, determination on whether or not a timer time setting mode is set (in the step S3), determination on whether or not a sleep time setting mode is set (in the step S4), determination on whether or not a time adjustment mode is set (in the step S5), and determination on whether or not a timer confirmation mode is set (in the step S6) are performed, respectively.

This means that in such a time displaying state where the current time is displayed on the display 54, only an operation of the key concerning with a function of the timepiece can be allowed to be received, and an operation of the key concerning with a function of the tuner will be inhibited from being inputted.

Then, if none of the modes in the steps S3–S6 is set, the process returns to the step S2 so as to repeat the above described operation. In addition, an operation in the case where any one of the modes is set will be described later.

On the other hand, if it is determined that the band key 22 is operated in the step S2, the process proceeds to the step S7, and a frequency displaying state where a frequency is displayed on the display 54 is set.

At the same time, the CPU 12 outputs a control signal so as to start a time-count operation of the first counter 58a. During such a time-count operation of the first counter 58a, an operation of all of the keys concerning with the function of the tuner 56 and the function of the timepiece can be received effectively.

More specifically, determination on whether or not the band key 22 is operated is made in the step S8, determination on whether or not the automatic scanning mode is set is made in the step S9, determination on whether or not the manual scanning mode is set is made in the step S10, determination on whether or not preset keys 44–52 are operated is made in the step S11, determination on whether or not the timer time setting mode is set is made in the step S12, determination on whether or not the sleep time setting mode is set is made in the step S13, and determination on whether or not the time adjustment mode is set is made in the step S14.

Then, if results of all of such determination are "NO", the process proceeds to the step S15. In this step, it is determined whether or not a time (t) being counted by the first counter 58a becomes coincident with the predetermined time t1. If not coincident, the above described determination will be repeated, and if coincident, the process returns to the step S1 and the displaying state of the display 54 is automatically set as the time displaying state.

Next, descriptions will be made for each mode on the case where the operation of the key is determined in the respective steps. In addition, since only a band changing-over process is executed in the step S16 if the band key is operated when the frequency is displayed, such a description thereof will be omitted.

Furthermore, the current time is counted by the CPU 12 in accordance with a predetermined time count routine. Since such a time count routine is well known, a description on such a current time count operation also omitted here.

(i) AUTOMATIC SCANNING MODE

When the frequency displaying state is set, if it is determined that the auto/manual key 24 is operated and the automatic scanning mode is set in the step S9, the process proceeds to the step S17, whereby an operation of the CPU 12 is changed or shifted to the automatic scanning operation.

More specifically, in the case where the up key 26 is operated just after the operation of the auto/manual key 24, the automatic upward scanning is set, and therefore, the frequency-division ratio for the programmable frequency divider (not shown) which constitutes a PLL circuit of the tuner 56 is sequentially incremented at a predetermined changing rate. On the other hand, if the down key 28 is operated just after the operation of the auto/manual key 24, the automatic downward scanning is set, and therefore, the frequency-division ratio of the programmable frequency divider is sequentially decremented at a predetermined changing rate.

Then, as a result of such an automatic scanning, if a signal having a level more than a predetermined level is received by the tuner 56, the above described automatic scanning operation is stopped, and a continuous receiving state is set, and the process returns to the step S8 so that determination of the key input can be made.

In addition, the time counting operation of the first counter 58a is performed only one time from the operation of the band key 22 in the step S2, or reset in response to completion of the above described automatic scanning operation.

(ii) MANUAL SCANNING MODE

When the frequency displaying state is set, if the up key 26 or the down key 28 is operated without passing through the operation of the auto/manual key 24, and if it is determined that the manual scanning mode is set in the step S10, the process proceeds to the step S18 thereafter, and the operation of the CPU 12 is changed or shifted to the manual scanning operation.

More specifically, in the case of the operation of the up key 26, a manual upward scanning is set, and the CPU 12 sequentially increments the frequency-division ratio of the programmable frequency divider at a predetermined changing rate during the operation of the up key 26. On the other hand, in the case of the operation of the down key 28, a manual downward scanning is set, and the frequency-division ratio of the programmable frequency divider is sequentially decremented at a predetermined changing rate during the operation of the down key 28.

In addition, in this case, the changing rate of the frequency-division ratio may be changed in accordance with a time period of the operation of the up key 26 or the down key 28.

Furthermore, likewise the case of the above described (i) of the automatic scanning mode, the time-counting operation of the first counter 58*a* may be reset in response to completion of the key operation.

(iii) PRESET CHANNEL SELECTION AND PRESET MEMORY MODES

When the frequency displaying state is set, if any one of the preset keys 44–52 is operated, the time-counting operation of the first counter 58*a* is started in response to such a key operation, and in the step S19, it is determined whether or not the time period (t) of the key operation is longer than the predetermined time t2.

Then, as a result of such determination, if the operation time (t) is longer than the predetermined time t2, the process proceeds to the step S20 so that the frequency-division ratio (channel selection data) being presently set in the programmable frequency divider is written in an address of the RAM 16 which corresponds to the operated preset key.

On the other hand, if the operation time (t) is not longer than the predetermined time t2, the process proceeds to the step S21 so that the frequency-division ratio (channel selection data) being stored in the address of the RAM 16 which corresponds to the operated preset key is read and set into the programmable frequency divider.

(iv) TIMER TIME SETTING MODE

When the time displaying state is set, if it is determined that the start/stop key 30 is operated and the timer time setting mode is set in the step S3, or when the frequency displaying state is set, if it is determined that the start/stop key 30 is operated and the timer time setting mode is set in the step S12, the process proceeds to the step S22, and an operation of the CPU 12 is changed or shifted to the timer time setting mode.

Figure 3:
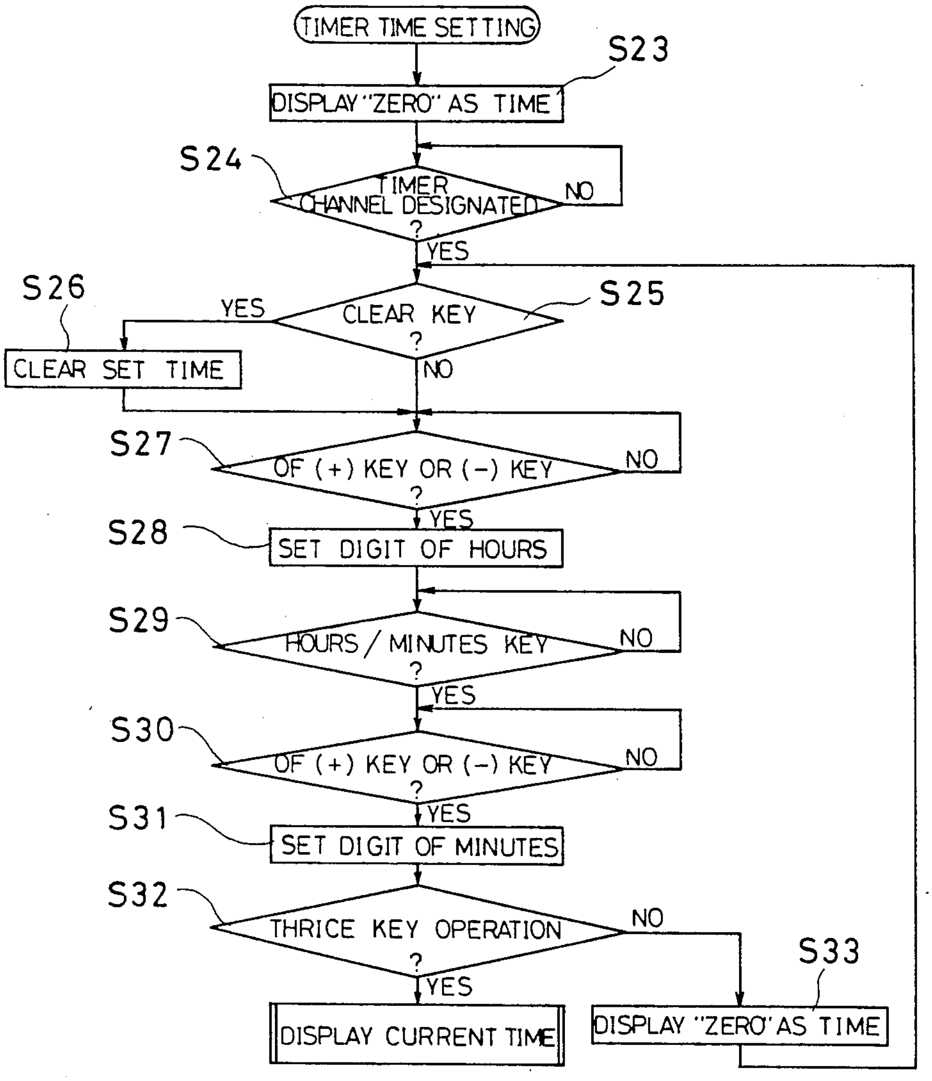
FIG. 3 is a flowchart showing a timer time setting mode in the embodiment.

In reference to FIG. 3, a description will be made on an operation of such a timer time setting mode.

More specifically, when the start stop key 30 is operated, in the step S23, the CPU 12 makes the display 54 display "zero". Thereafter, by operating any one of the preset keys 44–52, a timer channel, that is, an area or address of the RAM 16 is designated in the step S24.

When the timer channel is designated, the process proceeds to the step S25 so that it is determined whether or not the preset key 52 which also functions a clear key is operated. If the clear key, i.e. The preset key 52 is operated, in the step S26, data of a set timer time which is stored in the RAM 16 is cleared. If not operated, next, in the step S27, it is determined whether or not the (+) key 34 or the (−) key 36 is operated.

Then, when the operation of the key 34 or 36 is terminated, a digit of hours of a timer start time is set in the step S28, and a digit of minutes of the timer start time is set in the step S31 passing through the determination on the operation of the hours/minutes key 42 (in the step S29) and the determination on the operation of the (+) key 34 or the (−) key 36.

Thereafter, in the step S32, determination on the operation of the start/stop key 30 is made, and if the key operation is not thrice, in the step S33, the timer start time being set in accordance with the above described operation is stored in the predetermined address of the RAM 16 and the display 54 is brought to display "zero" again, and the process returns to the step S25 so that an operation thereof will be changed or shifted to a timer stop time setting operation. If the key operation is the thrice, the time displaying state is again set just after that the timer start time is stored in the RAM 16 in accordance with the above described operation. In addition, in the case where only the timer start time or the timer stop time is to be set, the start/stop key 30 may be continuously operated, and in this case, intermediate steps of the FIG. 3 will be omitted.

(v) SLEEP TIME SETTING MODE

When the time displaying state is set, if it is determined that the sleep key 32 is operated and the sleep time setting mode is set in the step S4, or when the frequency displaying state is set, it is determined that the sleep key 32 is operated and the sleep time setting mode is set in the step S13, the process proceeds to the step S34, and an operation of the CPU 12 will be changed or shifted to the sleep time setting mode.

Figure 4:
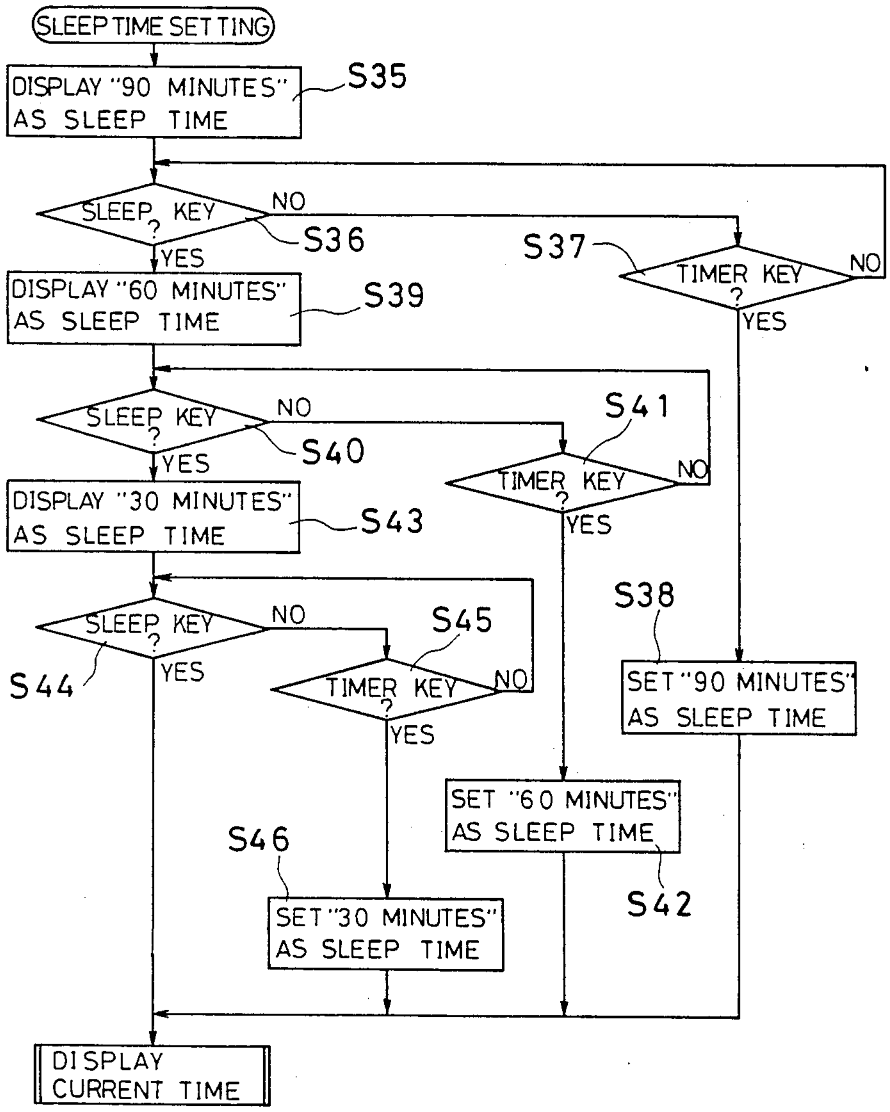
FIG. 4 is a flowchart showing a sleep time setting mode in the embodiment.

In reference to FIG. 4, a description is made on an operation of such a sleep time setting mode.

More specifically, if the sleep key 32 is operated, "90 minutes" is displayed on the display 54 by the CPU 12 in the step S35. Thereafter, in the step S36, it is determined whether or not the sleep key 32 is operated.

As a result of such determination, if the sleep key 32 is not operated, next, it is determined whether or not the timer key 38 is operated in the step S37. If the timer key 38 is operated, in the step S38, "90 minutes" is set in the second counter 58*b* by the CPU 12, and the time displaying state is set. If the timer key 38 is not operated, the process returns to the step S36.

On the other hand, if it is determined that the sleep key 32 is operated in the step S36, "60 minutes" is displayed on the display 54 by the CPU 12 in the step S39, and thereafter determination on the operation of the sleep key 32 is made again in the step S40.

Then, in such a state, if the timer key 38 is operated in the step S41, "60 minutes" is set in the second counter 58*b* by the CPU 12, and in the step S42, the mode is changed or shifted to the sleep operation and the time displaying state is set.

In addition, if the sleep key 32 is continuously operated three times, in the step S43, "30 minutes" is displayed on the display 54 by the CPU 12, and thereafter, if the timer key 38 is operated in the step S45, "30 minutes" is set in the second counter 58*b* and the time displaying state is set.

Meanwhile, in the case where the sleep key 32 is continuously operated four times as shown in the step S44, the sleep operation is canceled and the time displaying state is set just thereafter.

(vi) TIME ADJUSTMENT MODE

When the time displaying state is set, it is determined that the adjustment key 40 is operated and the time adjustment mode is set in the step S5, or when the frequency displaying state is set, if it is determined that the adjustment key 40 is operated and the timer adjustment mode is set in the step S14, the process proceeds to the step S47 and an operation of the CPU 12 will be changed or shifted to the time adjustment mode.

Figure 5:
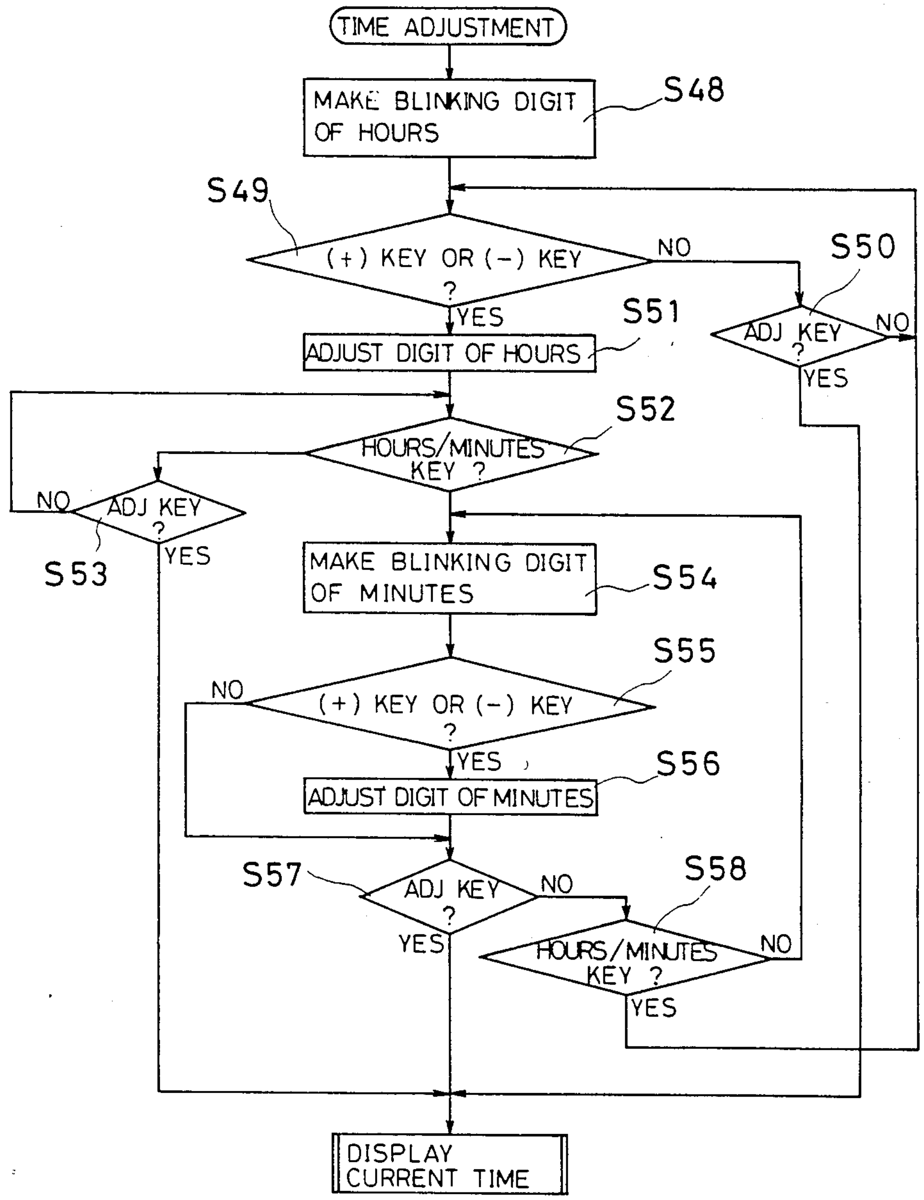
FIG. 5 is a current time adjustment mode in the embodiment.

Now, in reference to FIG. 5, a description is made on an operation of such a time adjustment mode.

More specifically, if the adjustment key 40 is operated, the CPU 12 makes blinking or flashing a digit of hours of the current time being displayed on the display 54 in the step S48. Thereafter, in the step S49, it is determined whether or not the (+) key 34 or the (−) key 36 is operated.

As a result of such determination, if it is determined that the (+) key 34 or the (−) key 36 is not operated, the process proceeds to the step S50 so that it is determined whether or not the adjustment key 40 is operated again. If the adjustment key 40 is operated again, the display 54 is returned to the time displaying state without any time adjustment operation. If the adjustment key 40 is not operated again, the process returns to the step S49 so that it is determined whether or not the (+) key 34 or the (−) key 36 is operated again.

On the other hand, in the case where it is determined that the (+) key 34 or the (−) key 36 is operated in the step S49, in the step S51, the CPU 12 makes adjustment of the digit of hours of the current time being displayed on the display 54 based on such an operation of the (+) key 34 or the (−) key 36, thereafter it is determined whether or not the hours/minutes key 42 is operated in the step S52.

As a result of such determination, if it is determined that the hours/minutes key 42 is not operated, the process proceeds to the step S53 so that it is determined whether or not the adjustment key 40 is operated. If the adjustment key 40 is operated, only the adjustment of the digit of hours of the current time is performed, and thereafter the display 54 is returned to the time displaying state. If the adjustment key 40 is not operated, the process returns to the step S52 so that it is determined whether or not the hours/minutes key 42 is operated.

On the other hand, when the hours/minutes key 42 is operated, the CPU 12 makes blinking or flashing the digit of minutes of the current time being displayed on the display 54 in the step S54, thereafter, in the step S55, it is determined whether or not the (+) key 34 or the (−) key 36 is operated. If the (+) key 34 or the (−) key 36 is operated, the CPU 12 makes adjustment of the digit of minutes of the current time being displayed on the display 54 based on such an operation of the (+) key 34 or the (−) key 36 in the step S56, and it is determined whether or not the adjustment key 40 is operated again in the step S57.

If the adjustment key 40 is operated again, the display 54 is returned to the time displaying state. If the adjustment key 40 is not operated, in the step S58, it is determined whether or not the hours/minutes key 42 is operated. In the case where the hours/minutes key 42 is operated, the process returns to the step S49, or the process returns to the step S54 in the case where the hours/minutes key 42 is not operated.

In addition, the (+) key 34 or the (−) key 36 is not operated in the step S55, the process proceeds to the step S57 so that it is determined whether or not the adjustment key 40 is operated.

(vii) TIMER TIME CONFIRMATION MODE

When the time displaying state is set, if it is determined that any one of the preset keys 44–52 is operated in the step S6, the process proceeds to the step S59 so that the operation of CPU 12 is changed or shifted to the timer time confirmation mode.

Figure 6:
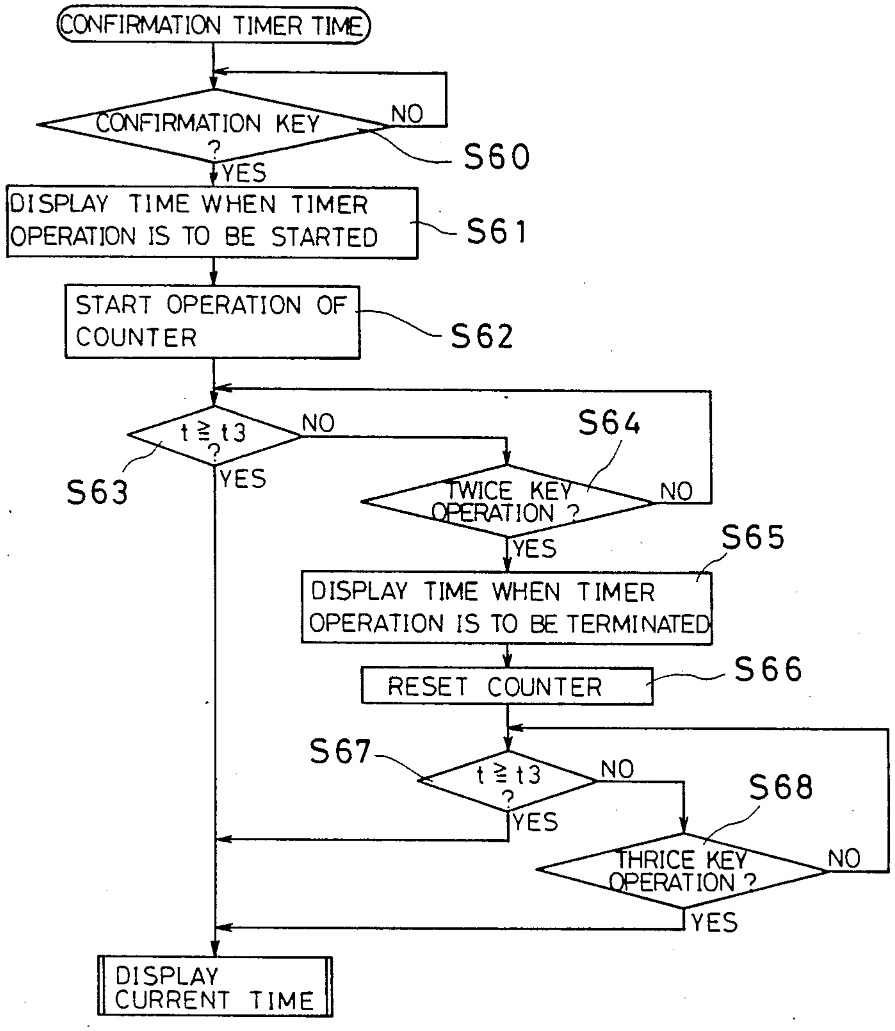
FIG. 6 is a flowchart showing a timer time confirmation mode in the embodiment.

In reference to FIG. 6, a description is made on an operation of such a timer time confirmation mode.

More specifically, when the time displaying state, in the step S60, if it is determined that any one of the preset keys 44–48 which also acts a timer time confirmation key is operated, in the step S61, the CPU 12 reads the timer start time which is stored in the RAM 16 correspondingly to the operated preset key and displays the same on the display 54. At the same time, the first counter 58*a* is triggered by the CPU 12 so as to start the time-counting operation of the predetermined time t3 in the step S62.

Then, before the first counter 58*a* counts the time t3, in the step S64, it is determined whether or not the twice key operation is made. If the twice key operation is made, the CPU 12 reads the timer stop time which is stored in the RAM 16 correspondingly to the operated key and displays the same on the display 54 in the step S65. In the step S66, the CPU 12 resets the first counter 58*a*, and in the step S68, it is determined whether or not the thrice key operation is made before the first counter 58*a* counts the time t3 again.

If the first counter 58*a* counts the time t3 in the steps S63 and S67, or if it is determined that the key operation is made in the step S68, the display 54 is returned to the time displaying state.

Next, in reference to FIGS. 7A–7E, a description will be made on an operation of a modification of the timer time setting mode. In this embodiment, various messages which may be stored in the ROM 14 in advance can be displayed for each necessary timing on a message display 60 (FIG. 1) which is composed of a dot matrix display of an LCD.

In the first step S100, a flag N which represents whether or not the preset keys 44–52 have been operated and a flag K which represents the digit of hours or the digit of minutes is designated are reset as "0". In the step S101, the CPU 12 makes the message display 60 display the message "Please set a timer start time" to notify the user that the timer start time can be set in that state. Thereafter, in the step S102, the message "Please select a timer channel" is displayed on the message display 60.

In the step S103, if it is determined that any one of the preset keys 44–48 is operated, the process proceeds to the step S103*a* (FIG. 7B) so that it is determined whether or not the flag N is "1". If the flag N is not "1", the CPU 12 displays on the message display 60 the respective messages "The timer channel 1 is presently set", "Please set the digit of hours", and "Please operate the (+) key 34 or the (−) key 36 to set the value of the digit of hours" in the respective steps S104, S105 and S106. Thereafter, the flag N is set as "1" in the step S107.

Figure 7A:
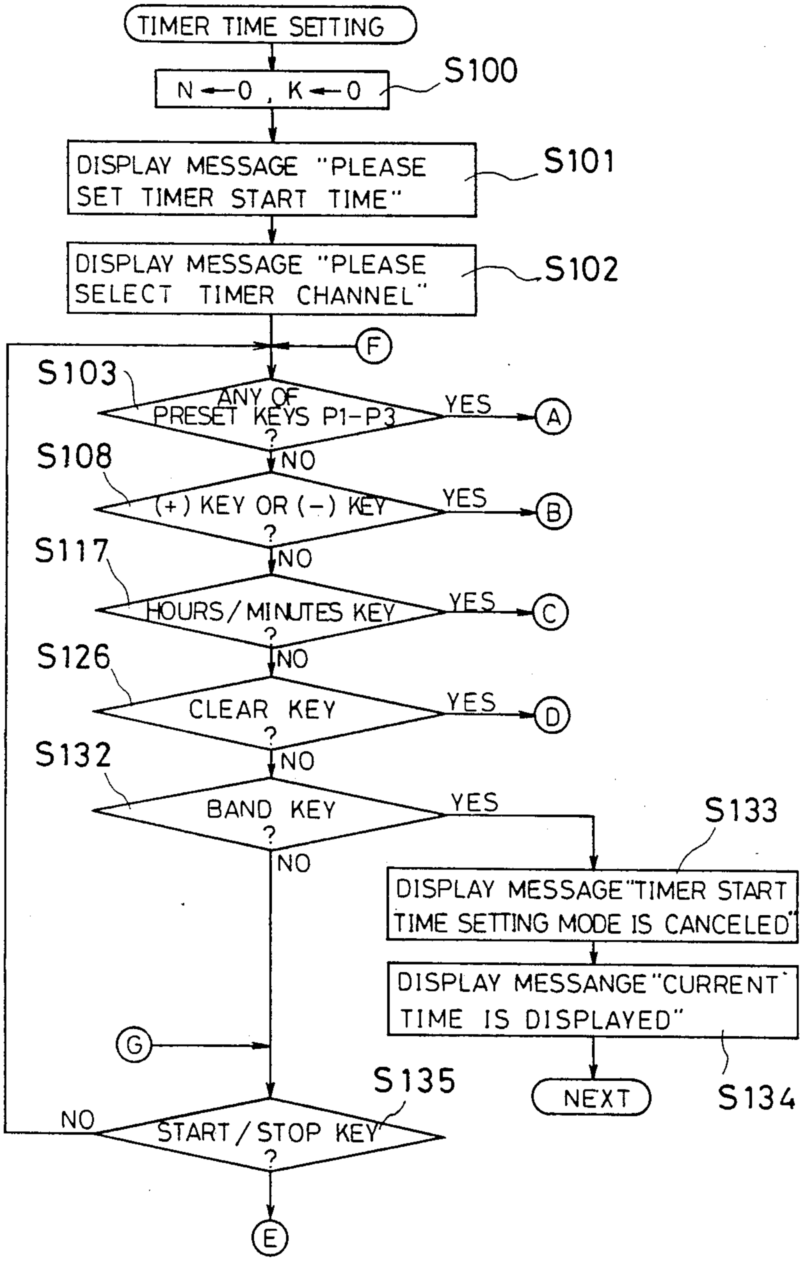
FIG. 7A–FIG. 7E are flowcharts showing a modification of the timer time setting mode.
Figure 7B:
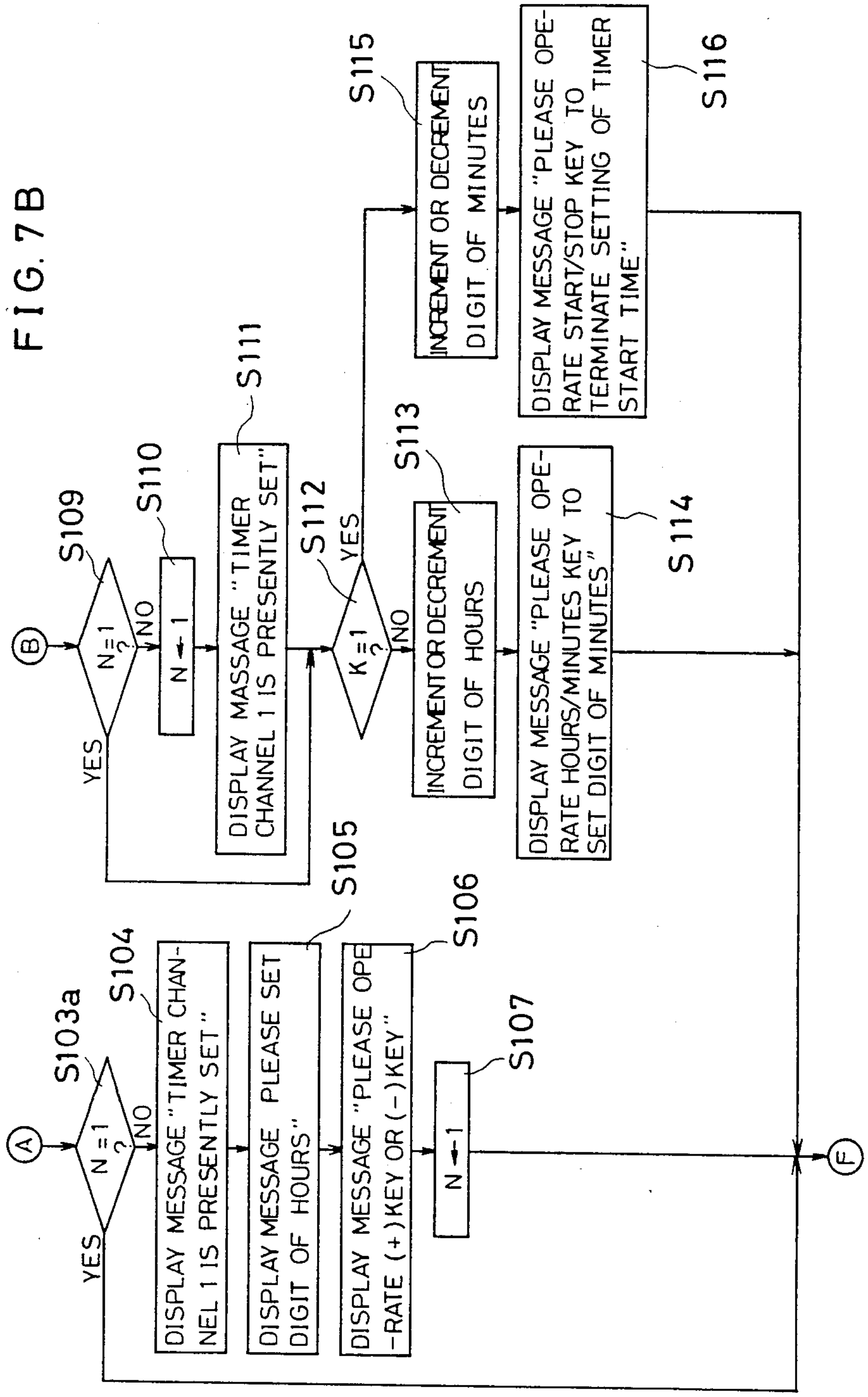

If either the (+) key 34 or the (−) key 36 is operated in the step S108 (FIG. 7A), the process proceeds to the step S109 (FIG. 7B). If it is determined that the flag N is "1" in the step S109, the process proceeds to the step S112, and if the flag N is not "1", in the step S110, the flag N is set, and the message "The timer channel 1 is presently set" is displayed on the message display 60 in the step S111. In the step S112, it is determined whether or not the flag K is "1". If the flag K is not "1", the CPU 12 increments or decrements the value of the digit of hours in the step S113, and in the step S114, displays the message "Please operate the hours/minutes key 42 to set or designate the digit of minutes". If the flag K is "1", the CPU 12 increments or decrements the digit of minutes in the step S115, and displays the message "Please operate the start/stop key 30 to terminate or complete the setting of the timer start time" in the step S116.

Figure 7C:
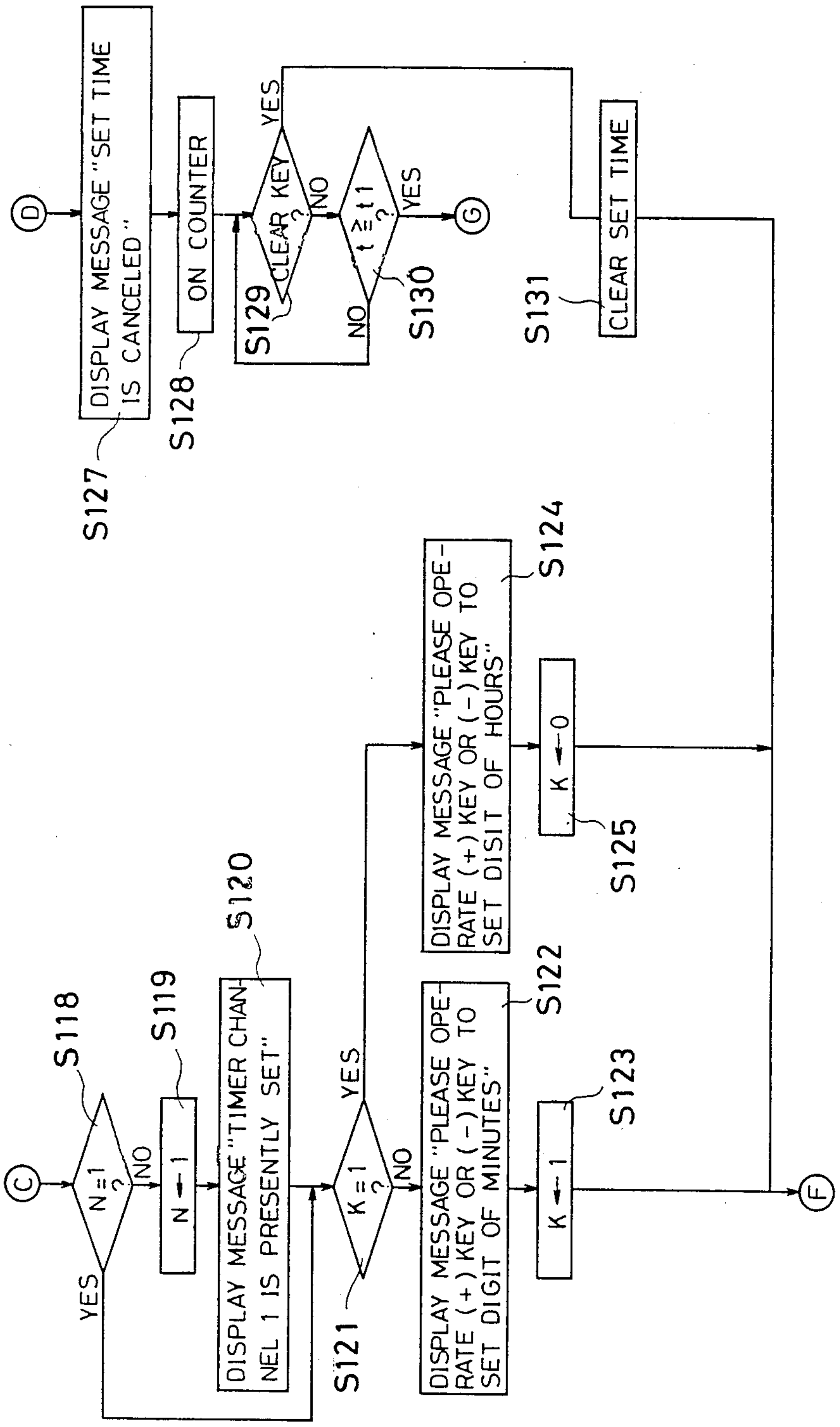
Figure 7D:
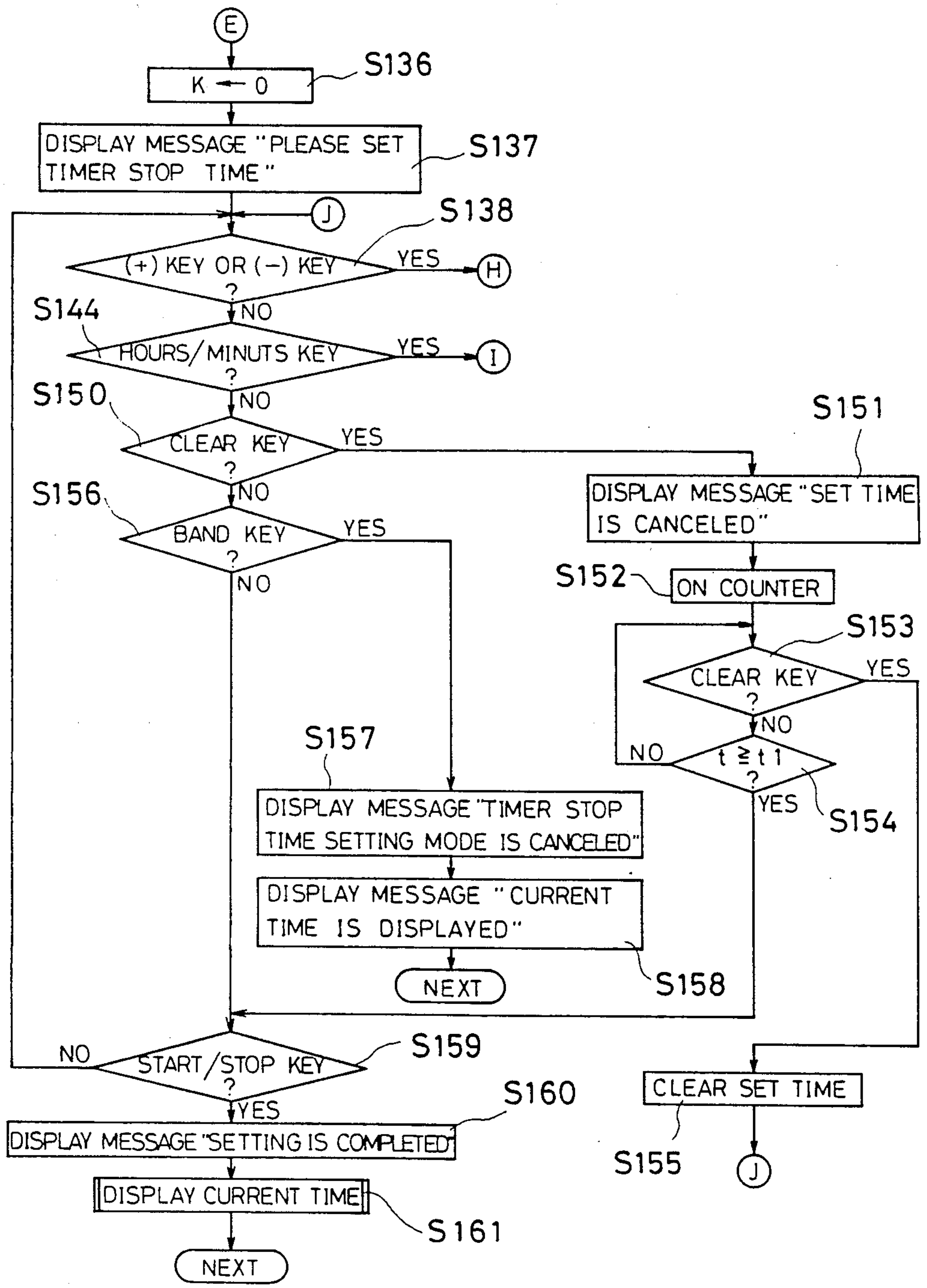

In the step S117 (FIG. 7A), it is determined that the hours/minutes key 42 is operated, the process proceeds to the step S118 (FIG. 7C). In the step S118, it is determined whether or not the flag N is "1". If the flag N is not "1", the flag N is set as "1" in the step S119, and the CPU 12 makes the message display 60 display the message "The timer channel 1 is presently set" in the step S120.

If the flag N is "1", likewise after the step S120, the process proceeds to the step S121 so that it is determined whether or not the flag K is "1". If the flag K is not "1", in the step S122, the CPU 12 makes the message display 60 display the message "Please operate the (+) key 34 or the (−) key 36 to set the value of the digit of minutes", and thereafter the flag K is set in the step S123. If the flag K is "1", in the step S124, the CPU 12 makes the message display 60 display the message "Please operate the (+) key 34 or the (−) key 36 to set the value of the digit of hours", and thereafter the flag K is reset as "0" in the step S125.

If the clear key, that is, the preset key 52 is operated in the step S126 (FIG. 7A), the process proceeds to the step S127 so that the message "The set time is canceled now" is displayed on the message display 60. Thereafter, in the step S128, the CPU 12 triggers the first counter 58a so as to count the time t1. If it is determined that the clear key, that is, the preset key 52 is operated again in the step S129 before the first counter 58a counts the time t1 in the step S130. If the clear key, that is, the preset key 52 is operated again, the CPU 12 clears the set timer start time in the step S131.

After the steps S107, S114, S116, S123, S125 or S131, the process returns to the previous step S103.

In the step S132, if it is determined that the band key 22 is operated, the CPU 12 makes the message display 60 display the message "The timer start time setting mode is now canceled" in the step S133 and the message "The current time is now displayed on the display 54" is displayed on the message display 60 in the step S134.

If the band key 22 is not operated in the step S132, in the step S135, it is determined whether or not the start/stop key 30 is operated. If not operated, the process returns to the step S103.

In addition, in the step S130, the counted time by the first counter reaches the time t1, the process proceeds to the step S135.

In the step S135, if it is determined that the start/stop key 30 is operated, the process proceeds to the step S136 (FIG. 7D) so that the CPU 12 resets the flag K. In the next step S137, the CPU 12 makes the message display 60 display the message "Please set a timer stop time".

Figure 7E:
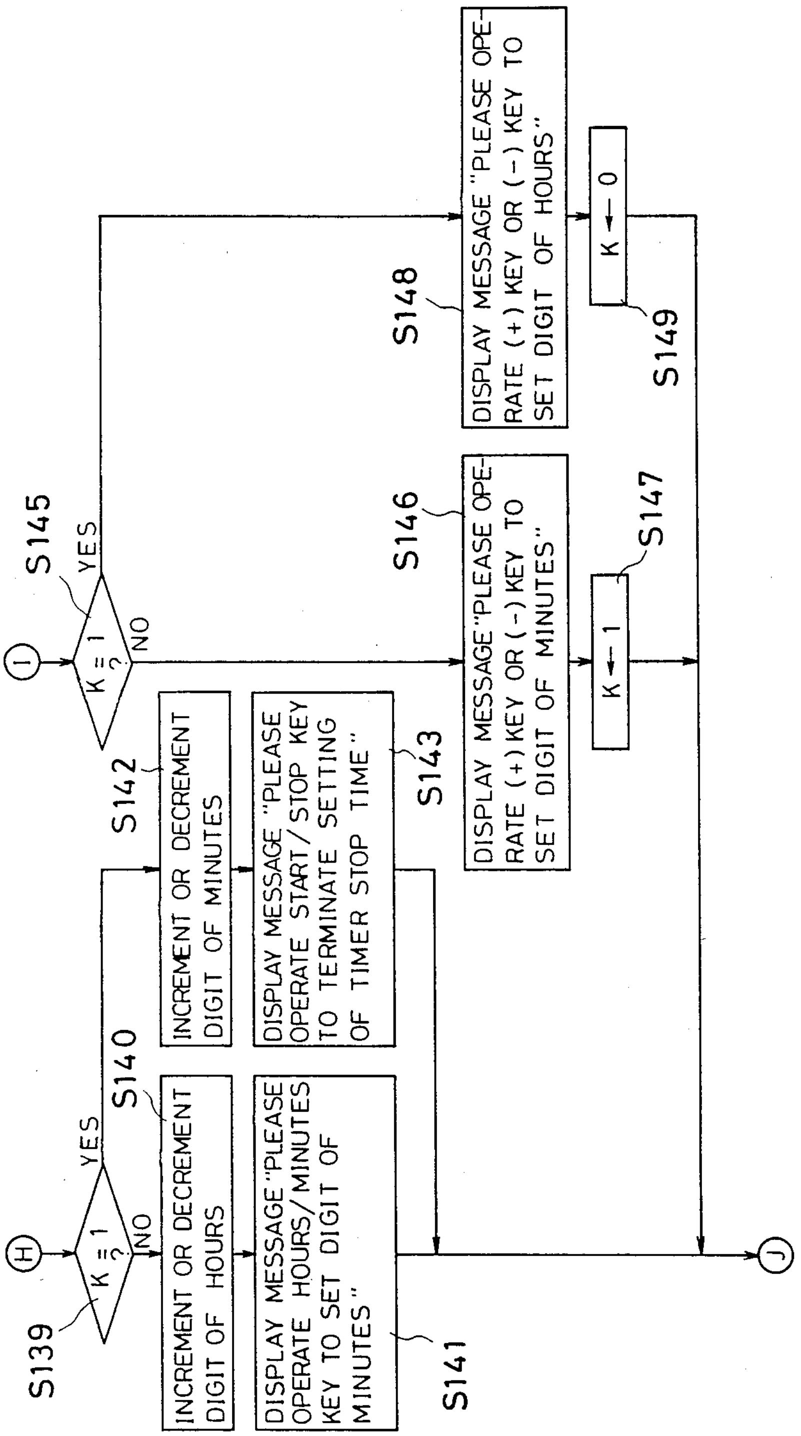

If an operation of the (+) key 34 or the (−) key 36 is detected in the step S138, the process proceeds to the step S139 (FIG. 7E). In the step S139, it is determined whether or not the flag K is "1".

If the flag K is "0" in the step S140, the CPU 12 increments or decrements the value of the digit of hours of the timer stop time in response to the operation of the (+) key 34 or the (−) key 36. Thereafter, in the step S141, the CPU 12 makes the message display 60 display the message "Please operate the hours/minutes key 42 to set the value of the digit of minutes".

If the flag K is "1", the process of the step S142 which is similar to the process of the step S140, in the step S143 is executed, and the CPU 12 makes the message display 60 display the message "Please operate the start/stop key to terminate or complete the setting of the timer stop time".

In the step S144 (FIG. 7D), it is determined whether or not the hours/minutes key 42 is operated, and if the hours/minutes key 42 is operated, the process proceeds to the step S145 (FIG. 7E). In the step S145, it is determined whether or not the flag K is "1".

If the flag K is not "1", in the step S146, the CPU 12 makes the message display 60 display the message "Please operate the (+) key 34 or the (−) key 36 to set the value of the digit of minutes". Thereafter, in the step S147, the flag K is set as "1". If the flag K is "1", in the step S148, the CPU 12 makes the message display 60 display the message "Please operate the (+) key 34 or the (−) key 36 to set the value of the digit of hours". In the next step S149, the flag K is reset as "0".

If it is determined that the clear key, i.e. the preset key 52 is operated in the step S150 (FIG. 7D), in the next step S151, the CPU 12 makes the message display 60 display the message "The set timer stop time is now canceled". Thereafter, in the step S152, the CPU 12 triggers the first counter 58a so as to count the time t1. If it is determined in the step S153 that the clear key, i.e. the preset key 52 is operated before the first counter 58a counts the time t1 (in the step S154), the CPU 12 clears the set timer stop time in the step S154.

In addition, after the steps S141, S143, S147 or S149, the process returns to the previous step S138.

In the step S156, it is determined whether or the band key 20 is operated. If the band key 20 is operated, in the next step S157, the CPU 12 makes the message display 60 display the message "The timer stop time setting mode is now canceled", and in the step S158, the message "The current time is presently displayed" is displayed on the message display 60.

In the case where "YES" is determined in the step S154 or "NO" is determined in the step S156, in the step S159, it is determined whether or not the start/stop key 30 is operated. If not operated, the process returns to the previous step S138, and if operated, in the next step S160, the message "The timer time setting mode is now completed" is displayed on the message display 60. Thereafter, the current time is displayed on the display 54 in the step S161.

As described above, in the embodiment shown in FIGS. 7A–7E, the respective messages as guidance for the user can be displayed on the message display 60, and therefore, it is avoidable to erroneous operation of the key by the user.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tuner with a timepiece, comprising:

display means capable of being changed between a time displaying state and a frequency displaying state;

a first key group including a plurality of keys;

timepiece means responsive to said plurality of keys of said first key group for generating a time signal;

a second key group including a plurality of keys;

tuner means responsive to said plurality of keys of said second key group for demodulating a received broadcast signal;

means for inhibiting said tuner means from responding to a key-entry of said second key group when said display means is changed into said time displaying state; and means responsive to an operation of a specific key included in said second group for changing said display means from said time displaying state to said frequency displaying state and for allowing said tuner means to respond to a key-entry of said second key group.

2. A tuner with a timepiece in accordance with claim 1, wherein said specific key includes a band key for selecting or changing a frequency band to be received by the tuner.

3. A tuner with a timepiece in accordance with claim 1, further comprising means for making said display means display the frequency for a predetermined time period after the operation of said specific key.

4. A tuner with a timepiece in accordance with claim 1, wherein said first key group includes a timer time setting key for setting a time when a timer is to be operated, further comprising means for canceling the time set by said timer time setting key in response to an operation of a key included in said second key group when said time displaying state is set.

5. A tuner with a timepiece in accordance with claim 4, further comprising a first storing means for storing channel selection data for the tuner, wherein said second key group includes a preset key for writing or reading the channel selection data into or from said first storing means.

6. A tuner with a timepiece in accordance with claim 5, further comprising second storing means for storing a plurality of timer times in respective timer channels thereof, and means for designating each of the timer channels of said second storing means in response to an operation of said preset key when a timer time setting mode is set by said timer time setting key.

7. A tuner with a timepiece in accordance with claim 6, wherein said preset key includes a plurality of preset keys, and said means for designating each of the timer channels of said second storing means designates a timer channel corresponding to respective one of said plurality of preset keys.

8. A tuner with a timepiece in accordance with claim 4, wherein said display means is responsive to an operation of a key of said second key group when said display means is in a time displaying state for displaying said timer being set by said timer time setting key.

9. A tuner with a timepiece in accordance with claim 8, further comprising a first storing means for storing a channel selection data for the tuner, and a preset key for writing or reading the channel selection data into or from said first storing means, said displaying means being responsive to an operation of said preset key for displaying said tuner time.

10. A tuner with a timepiece in accordance with claim 1, further comprising means for setting said display means as said time displaying state in response to an operation of said first key group, and means for setting a state where a function of the timepiece can be controlled in accordance with the operated key.

* * * * *